US012811050B2

(12) United States Patent
Mikoshiba et al.

(10) Patent No.: US 12,811,050 B2
(45) Date of Patent: Nov. 24, 2026

(54) DUST CORE AND INDUCTOR

(71) Applicant: TOKIN Corporation, Shiroishi (JP)

(72) Inventors: Shun Mikoshiba, Shiroishi (JP); Hiroshi Shima, Shiroishi (JP); Kenichiro Kobayashi, Shiroishi (JP); Miho Chiba, Shiroishi (JP); Akiri Urata, Shiroishi (JP); Makoto Yamaki, Shiroishi (JP); Naoto Onishi, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 758 days.

(21) Appl. No.: 18/295,202

(22) Filed: Apr. 3, 2023

(65) Prior Publication Data

US 2023/0326656 A1 Oct. 12, 2023

(30) Foreign Application Priority Data

Apr. 6, 2022 (JP) ................................ 2022-063199

(51) Int. Cl.
*H01F 27/255* (2006.01)
*H01F 41/02* (2006.01)

(52) U.S. Cl.
CPC ....... *H01F 27/255* (2013.01); *H01F 41/0246* (2013.01)

(58) Field of Classification Search
CPC .. H01F 27/255; H01F 41/0246; H01F 27/306; H01F 1/15375; H01F 3/08; H01F 27/34
See application file for complete search history.

(56) References Cited

U.S. PATENT DOCUMENTS

| | | | | |
|---|---|---|---|---|
| 6,017,490 | A | 1/2000 | Otsuka et al. | |
| 2021/0280347 | A1* | 9/2021 | Nakamura | H01F 1/24 |
| 2022/0177694 | A1* | 6/2022 | Nobe | H01F 27/022 |

FOREIGN PATENT DOCUMENTS

| | | | |
|---|---|---|---|
| JP | H10212503 A | | 8/1998 |
| JP | 2020031140 A | * | 2/2020 |

* cited by examiner

*Primary Examiner* — Rebecca Janssen
(74) *Attorney, Agent, or Firm* — McCoy Russell LLP

(57) ABSTRACT

To provide a dust core with good direct current superimposition characteristics and an inductor using such a dust core. A dust core according to an aspect of the present disclosure includes magnetic powder particles that are bound together through a binder layer, in which when a magnetic permeability in a state where a magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher.

11 Claims, 11 Drawing Sheets

DUST CORE AND INDUCTOR

INCORPORATION BY REFERENCE

This application is based upon and claims the benefit of priority from Japanese patent application No. 2022-63199, filed on Apr. 6, 2022, the disclosure of which is incorporated herein in its entirety by reference.

BACKGROUND

The present disclosure relates to a dust core and an inductor.

In recent years, inductors are being used in various electronic devices. In particular, power supply for electronic devices such as personal computers has increased with the increase in the power consumption of the electronic devices. Therefore, inductors that are used in electronic devices such as personal computers are required to exhibit high inductance even when a large current is applied. Japanese Unexamined Patent Application Publication No. H10-212503 discloses a method for manufacturing a powder compacted body of an amorphous soft magnetic alloy with little decrease in magnetic permeability in the high-frequency region.

SUMMARY

As described above, inductors used in electronic devices such as personal computers are required to exhibit high inductance even when a large current is applied. That is, inductors that exhibit low magnetic permeability even when a large current is applied, in other words, inductors with good direct current superimposition characteristics are in demand.

In view of the aforementioned problem, an object of the present disclosure is to provide a dust core with good direct current superimposition characteristics and an inductor using such a dust core.

A dust core according to an aspect of the present disclosure includes magnetic powder particles that are bound together through a binder layer, in which when a magnetic permeability in a state where a magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher.

An inductor according to an aspect of the present disclosure includes the aforementioned dust core and a coil.

According to the present disclosure, a dust core with good direct current superimposition characteristics and an inductor using such a dust core can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

<Inductor>

Figure 1:
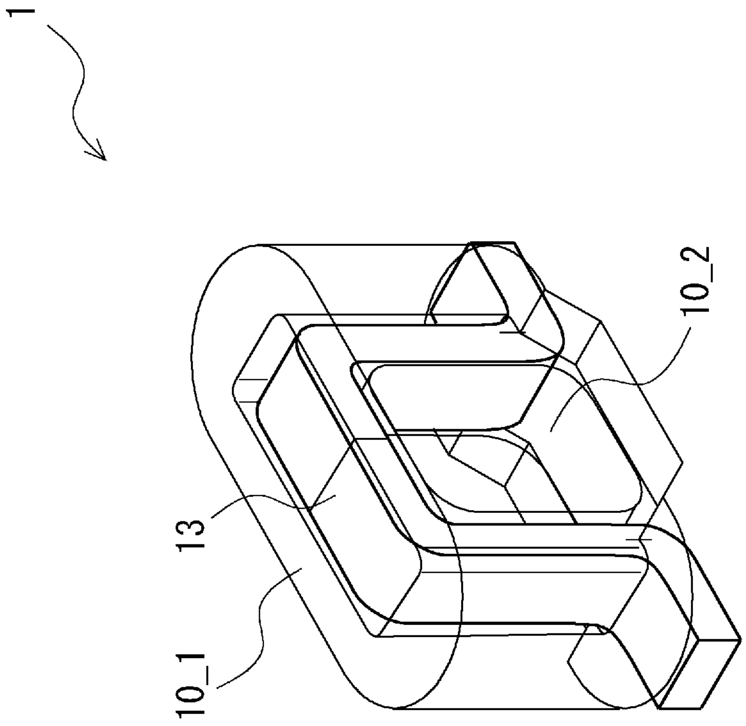
FIG. 1 is a perspective view showing an example of an inductor according to an embodiment.

FIG. 1 is a perspective view showing an example of an inductor according to an embodiment. As shown in FIG. 1, an inductor 1 according to this embodiment includes dust cores 10_1 and 10_2, and a coil 13. The dust core 10_1 has a cavity vertically penetrating the center part thereof, and is disposed so as to surround the coil 13. The dust core 10_2 is located inside the coil 13 so as to be disposed in the recessed part of the coil 13 having a U-shape in cross section.

For example, the inductor 1 shown in FIG. 1 can be formed by placing the core inductor 10_2 in the recessed part of the coil 13 and then press-fitting the dust core 10_1 from the top. Accordingly, the inductor 1 in which the coil 13 is surrounded by the dust cores 10_1 and 10_2 can be formed. Note that in this specification, the dust cores 10_1 and 10_2 are also collectively referred to as a dust core 10. Further, the configuration of the inductor 1 shown in FIG. 1 is a mere example, and the dust core 10 according to this embodiment may be used for an inductor having a configuration other than that shown in FIG. 1. Hereinbelow, a dust core according to this embodiment will be described in detail.

<Dust Core>

A dust core according to this embodiment is a dust core in which magnetic powder particles are bound together through a binder layer. In the dust core of this embodiment, when a magnetic permeability in a state where the magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher. Here, the value expressed by $\mu_{B=0.5\ T}/\mu_{B=0\ T}$ indicates the direct current superimposition characteristics. Note that how to calculate the value of the direct current superimposition characteristics, that is, the value expressed by $\mu_{B=0.5\ T}/\mu_{B=0\ T}$, will be described later.

The magnetic powder used in a dust core according to this embodiment is soft magnetic powder containing an iron element. For example, the particle size of the magnetic powder falls within a range from 2 μm or larger to 25 μm or smaller, preferably, a range from 5 μm or larger to 15 μm or smaller. Note that in this embodiment, the particle size is a median diameter D50, which is a value measured using a laser diffraction-and-scattering method.

In this embodiment, metal glass powder can be used as the magnetic powder. For example, amorphous metal glass powder produced through an atomization process can be used as the metal glass powder. Examples of such amorphous metal glass powder include an Fe—P—B alloy, an Fe—B—P—Nb—Cr alloy, an Fe—Si—B alloy, an Fe—Si—B—P alloy, an Fe—Si—B—P—Cr alloy, and an Fe—Si—B—P—C alloy, and by powdering the alloy through an atomization process, metal glass powder having a glass transition point can be produced. In particular, in this embodiment, it is preferable to use an Fe—B—P—Nb—Cr-based material. Note that the metal glass powder obtained through an atomization process is not limited to those mentioned above, and amorphous metal glass powder which does not have a glass transition point can also be used.

Further, in the present example embodiment, for example, nanocrystalline powder may be used as the magnetic powder. For example, nanocrystalline powder produced through an atomization process may be used as the nanocrystalline powder. For example, by powdering an Fe—Si—B—P—C—Cu-based material, an Fe—Si—B—Cu—Cr-based material, an Fe—Si—B—P—Cu—Cr-based material, an Fe—B—P—C—Cu-based material, an Fe—Si—B—P—Cu-based material, an Fe—B—P—Cu-based material, or an Fe—Si—B—Nb—Cu-based material through an atomization process, it is possible to form nanocrystalline powder exhibiting at least two exothermic peaks indicating crystallization of the magnetic powder during the heat treatment process of the magnetic powder. While there is no particular limitation on the nanocrystalline powder to be used, it is preferable to use, for example, an Fe—Si—B—P—Cu—Cr-based material.

In this embodiment, crystalline powder may be used as the magnetic powder. For example, crystalline powder produced through a carbonyl process or an atomization process can be used as the crystalline powder. For example, carbonyl iron, an Fe—Si alloy, an Fe—Si—Cr alloy, or an Fe—Si—Al alloy can be used, and by powdering it through a carbonyl process or an atomization process, crystalline powder can be produced. In particular, in this embodiment, it is preferable to use carbonyl iron or an Fe—Si-based material.

In this embodiment, the closer the shape of the particles of the magnetic powder to a spherical shape, the more preferable it is. If the degree of sphericity of the particles is low, protrusions appear on the surfaces of the particles, and stresses from surrounding particles may concentrate on these protrusions when a forming pressure is applied, thus causing damage to the coating, whereby an insulating property cannot be maintained at a satisfactory level, and as a result, there may be cases where the magnetic characteristics of the obtained dust core are deteriorated (in particular, the core loss). Note that the degree of sphericity of the particles can be controlled to a suitable range by adjusting the conditions for manufacturing the magnetic powder, for example, in the case of performing a water atomization process, adjusting the volume and pressure of water of a high-pressure jet, the temperature of a molten raw material, and the feeding speed of the molten raw material. Specific manufacturing conditions vary depending on the compositions of the magnetic powder to be manufactured and the desired productivity.

In the dust core according to this embodiment, the binder layer has a function of binding the magnetic powder particles together. The binder layer includes a low-melting-point glass and a resin material. In this embodiment, the total volume percentage of the low-melting-point glass and the resin material with respect to the volume of the magnetic powder of the dust core is less than 10% by volume. As the low-melting-point glass, phosphate-based glass, tin phosphate-based glass, borate-based glass, silicate-based glass, borosilicate-based glass, barium-silicate-based glass, bismuth oxide-based glass, germanate-based glass, vanadate-based glass, aluminophosphate-based glass, arsenate-based glass, telluride-based glass, and the like can be used. In particular, in this embodiment, it is preferable to use a phosphate-based low-melting-point glass or a tin phosphate-based low-melting-point glass. Further, the volume percentage of the low-melting-point glass with respect to the volume of the magnetic powder falls within a range from 0.5% by volume or higher to 6% by volume or lower, preferably a range from 1.25% by volume or higher to 3% by volume or lower.

Further, at least one type of resin selected from the group consisting of phenolic resin, polyimide resin, epoxy resin, and acrylic resin can be used as the resin material contained in the binder layer. Further, the volume percentage of the resin material with respect to the volume of the magnetic powder falls within a range from 0.5% by volume or higher to 9% by volume or lower, preferably, a range from 1% by volume or higher to 5% by volume or lower.

In the dust core of this embodiment, when a magnetic permeability in a state where the magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher, preferably, 0.8 or higher.

Further, in the dust core according to this embodiment, the filling rate by volume of the magnetic powder (that is, the content of the magnetic powder by volume) is 88% by volume or higher, preferably, 90% by volume or higher. As described above, since the filling rate by volume of the magnetic powder is high in the dust core according to this embodiment, good direct current superimposition characteristics are exhibited.

Further, in this embodiment, an iron loss in the dust core at 1 MHz and 50 mT is 4500 kW/m$^3$ or lower, preferably 1500 kW/m$^3$ or lower. Therefore, it is possible to realize a dust core having a low iron loss and exhibiting good direct current superimposition characteristics.

<Method for Manufacturing Dust Core>

Figure 2:
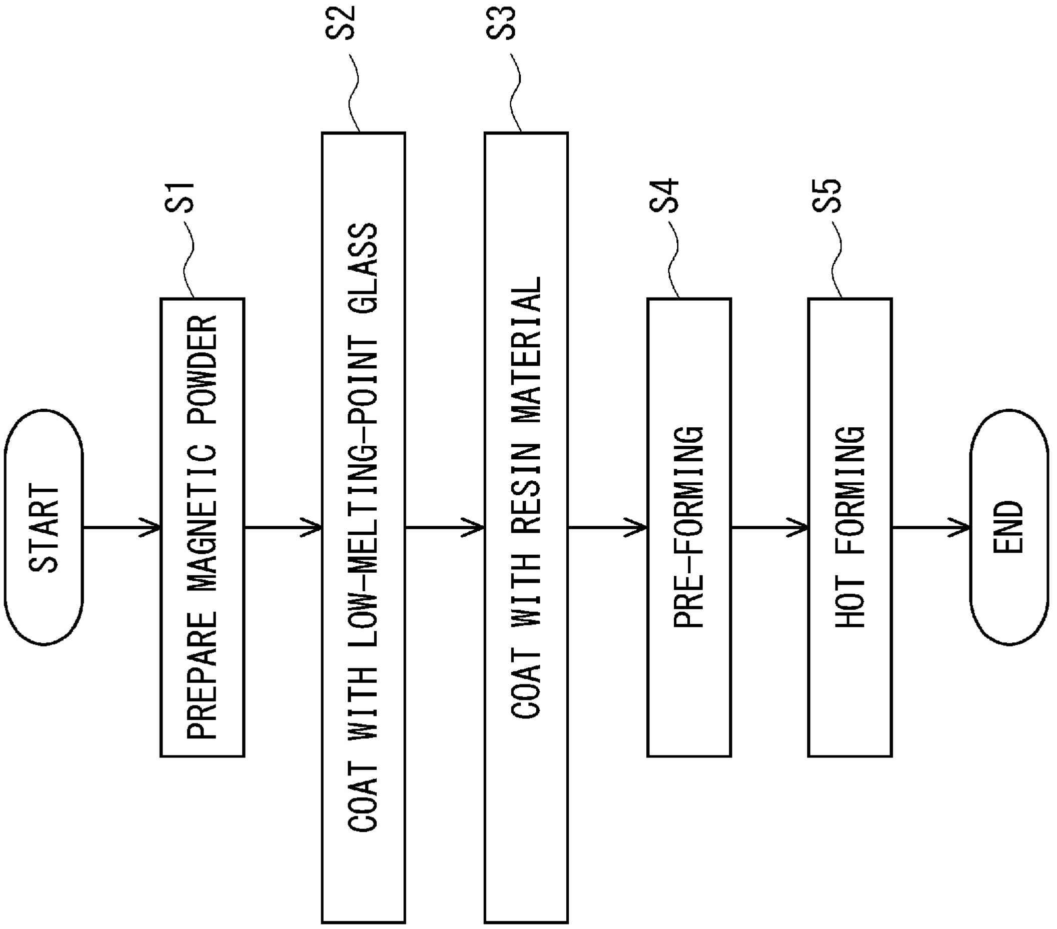
FIG. 2 is a flowchart for describing a method for manufacturing a dust core according to an embodiment.
Figure 3:
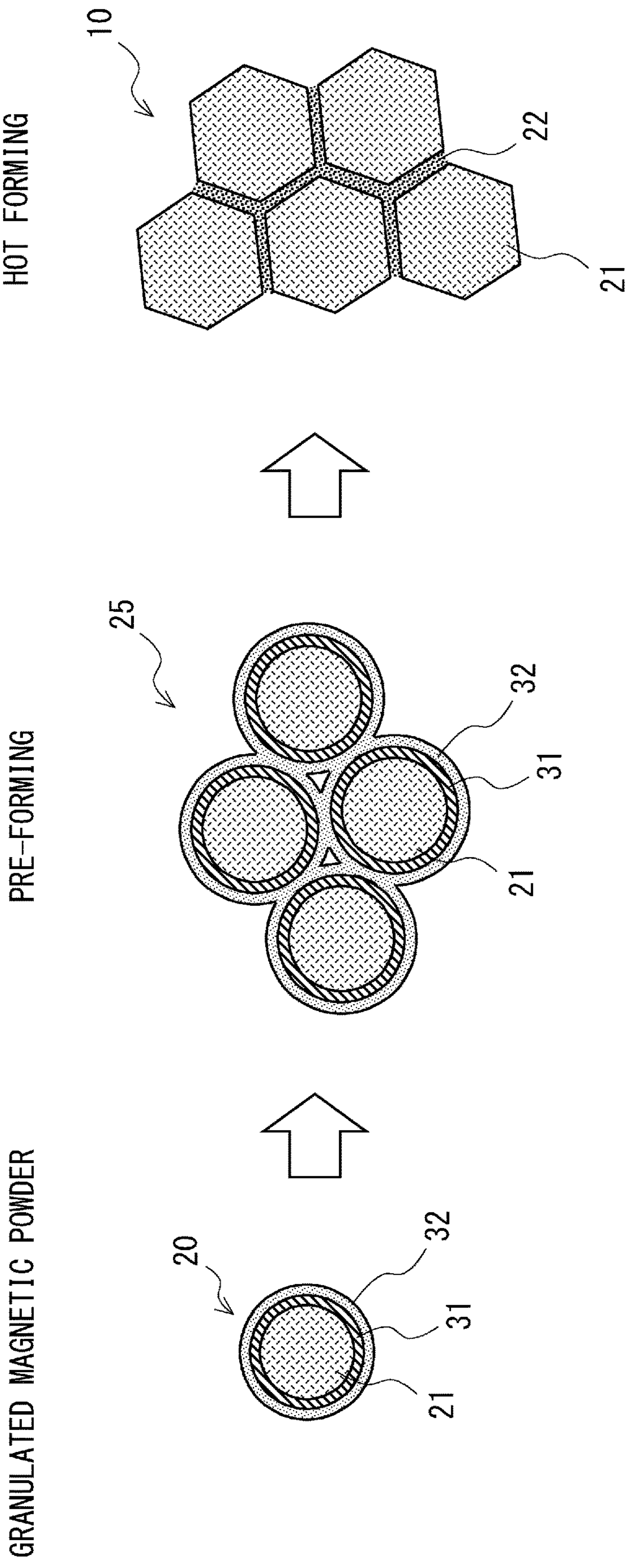
FIG. 3 is a schematic diagram for describing a method for manufacturing a dust core according to an embodiment.

Next, a method for manufacturing a dust core according to this embodiment will be described. FIG. 2 is a flowchart for describing a method for manufacturing a dust core according to this embodiment. FIG. 3 is a schematic diagram for describing a method for manufacturing a dust core according to this embodiment.

As shown in FIG. 2, in manufacturing a dust core, first, magnetic powder is prepared (Step S1). For the magnetic powder, the aforementioned magnetic powder can be used. For the magnetic powder, it is preferable to use a magnetic material that softens at a temperature equal to or higher than 400° C. (a material that deforms easily during hot forming). For example, after vacuum melting the raw materials of the magnetic powder, the magnetic materials are powdered and rapidly cooled at the same time through a water atomization process, whereby amorphous magnetic powder can be obtained. The magnetic powder thus obtained is classified as necessary to remove abnormally coarsened (enlarged) particles.

Next, the magnetic powder is coated with a low-melting-point glass (Step S2). For the low-melting-point glass, it is preferable to use a material that softens at a temperature equal to or higher than 400° C., that is, softens during hot forming, and functions as an insulating material and a binding material after the hot forming. For example, a phosphate-based glass can be used as the low-melting-point glass. In coating the magnetic powder with a low-melting-point glass, a wet thin film fabrication method such as a sol-gel method, and the like, or a dry thin film fabrication method such as sputtering can be used. For example, in a dry thin film fabrication method, by mixing magnetic powder and low-melting-point glass powder while applying a strong mechanical energy, a low-melting-point glass layer can be formed on the surface of the magnetic powder.

An example thereof is mixing 1000 g of magnetic powder and 10 g of low-melting-point glass powder and coating the magnetic powder with the low-melting-point glass using a dry thin film fabrication method. Accordingly, the volume percentage of the low-melting-point glass coated on the magnetic powder with respect to the volume of the magnetic powder falls within a range from 0.5% by volume or higher to 6% by volume or lower.

Next, the magnetic powder coated with the low-melting-point glass is further coated with a resin material for granulation (Step S3). For the resin material, the aforementioned resin material can be used. As the resin material, it is preferable to use a material that softens at a temperature of about 100° C. and functions as an insulating material and a binding material after the hot forming. Further, as the resin material, it is preferable to use a material that does not easily decompose during hot forming (at a high temperature). A rolling granulation method or a spray dry method may be employed in performing coating (granulation) with a resin material. Specifically, by mixing a resin material dissolved in an organic solvent and the magnetic powder coated with a low-melting-point glass and drying the mixture, a resin layer can be formed on the low-melting-point glass of the magnetic powder.

The drawing on the left in FIG. 3 shows a granulated magnetic powder 20. As shown in FIG. 3, the granulated magnetic powder 20 has a low-melting-point glass 31 coated on the magnetic powder 21 and a resin material 32 is further coated on the low-melting-point glass 31. As an example thereof, the magnetic powder 21 has a diameter of 11 μm, the low-melting-point glass 31 has a thickness of 20 nm, and the resin material has a thickness of 20 nm.

Next, the granulated magnetic powder is pre-formed (Step S4). For example, pre-forming can be performed by placing the granulated magnetic powder into a mold and applying pressure (for example, at room temperature and over 500 $kgf/cm^2$ and then heating the compacted body at a predetermined temperature (for example, at 100° C. to 150° C.) without applying any pressure and thereby hardening the compacted body. In the case where the resin material to be used is a thermosetting resin, an intermediate molded body is formed using curing (hardening) of the resin at the time of heating. In the case where the resin material to be used is a thermoplastic resin, an intermediate molded body is formed through softening of the resin at the time of heating and solidification of the resin at the time of cooling.

That is, as shown in the middle drawing in FIG. 3, in the case of performing pre-forming, an intermediate molded body 25 is formed in such a way that the particles of the magnetic powder 21 (coated with the low-melting-point glass 31) are bound together through the resin material 32 located in the outermost surface. Note that since the low-melting-point glass does not soften at a pre-forming temperature (for example, 150° C.), it does not exhibit binding property nor fluidity. Note that the pre-forming process (Step S4) may be omitted.

Next, the pre-formed intermediate molded body (in the case where Step S4 is omitted, the granulated magnetic powder) is formed by hot forming (Step S5). Hot forming is performed by heating a mold with the pre-formed intermediate molded body (or granulated magnetic powder) placed therein while applying pressure thereto. At this time, the heating temperature can be set, for example, as described below.

In the case where the magnetic powder used is metal glass powder, the temperature when performing hot forming is set to be equal to or above the higher one of the softening temperature of the low-melting-point glass and the glass transition temperature of the magnetic powder, and equal to or below the crystallization temperature of the magnetic powder. By setting the hot-forming temperature to be equal to or higher than the glass transition temperature of the magnetic powder, plastic deformation of the magnetic powder is prone to occur, whereby a high filling rate of the magnetic powder can be obtained. Further, by setting the hot-forming temperature to be equal to or higher than the softening temperature of the low-melting-point glass, the low-melting-point glass coated with the magnetic powder deforms so as to conform to the deformation of the magnetic powder whereby it is possible to provide a good coating on the surface of the magnetic powder and reduce an iron loss of the dust core. An example of the temperature range is from 450° C. or higher to 500° C. or lower.

In the case where the used magnetic powder is nanocrystalline powder, the temperature when performing hot forming is set to be equal to or above the higher one of the softening temperature of the low-melting-point glass and a first crystallization temperature of the magnetic powder, and equal to or below a second crystallization temperature of the magnetic powder. By setting the hot-forming temperature to be around the first crystallization temperature, plastic deformation of the magnetic powder is prone to occur simultaneously with crystallization of the a-Fe phase, whereby a high filling rate of the magnetic powder can be obtained. Further, by setting the hot-forming temperature to be equal to or higher than the softening temperature of the low-melting-point glass, the low-melting-point glass coated with the magnetic powder deforms so as to conform to the deformation of the magnetic powder whereby it is possible to provide a good coating on the surface of the magnetic powder and reduce an iron loss of the dust core. An example of the temperature range is from 400° C. or higher to 500° C. or lower. Further, in this embodiment, it is preferable to set the temperature when performing hot forming to be equal to or above the higher one of the softening temperature of the low-melting-point glass and a temperature 40° C. higher than the first crystallization temperature of the magnetic powder. Here, the first crystallization temperature and the second crystallization temperature are as described below. That is, by heat treating the magnetic material having the amorphous structure, crystallization occurs twice or more times. The temperature at which crystallization first starts is a first crystallization temperature, and the temperature at which crystallization that starts thereafter is a second crystallization temperature. To be more specific, the magnetic powder exhibits at least two exothermic peaks indicating crystallization of the magnetic powder in the heat treatment process which is expressed by a DSC (Differential Scanning calorimetry) curve obtained by performing DSC. Among the aforementioned exothermic peaks, the exothermic peak on the lowermost temperature side is the first crystallization temperature at which the α-Fe phase crystallizes, and the next exothermic peak is the second crystallization temperature at which borides and the like crystalize.

In the case where the used magnetic powder is crystalline powder, the temperature when performing hot forming is set to be equal to or above the softening temperature of the low-melting-point glass. By setting the hot-forming temperature to be equal to or higher than the softening temperature of the low-melting-point glass, plastic deformation of the magnetic powder is prone to occur owing to the dynamic recovery of the magnetic powder, whereby a high filling rate of the magnetic powder can be obtained. Further, by setting the hot-forming temperature to be equal to or higher than the softening temperature of the low melting-point-glass, the low-melting-point glass coated with the magnetic powder deforms so as to conform to the deformation of the magnetic powder whereby it is possible to provide a good coating on the surface of the magnetic powder and reduce an iron loss of the dust core. An example of the temperature range is from 400° C. or higher to 600° C. or lower.

In this embodiment, it is preferable to set the temperature conditions such that the heating temperature falls within the aforementioned temperature range and the amount of the iron loss of the dust core is reduced.

Further, the pressure at the time of hot forming is, for example, 5 to 10 ton·f/cm$^2$. In the case where the applied pressure is too low, the filling rate of the molded body (the dust core) lowers, whereby the iron loss of the dust core become large. On the other hand, when the applied pressure is too high, the mold wear increases, which is not desirable in terms of cost. Therefore, it is preferable to set the pressure range to fall within the aforementioned range.

Further, the time for performing hot forming is preferably within a range from 5 to 60 seconds, more preferably for 30 seconds or less. If the time for performing hot forming is too short, heat is sufficiently conducted to the inside of the molded body and deformation due to softening of the magnetic powder cannot be sufficiently achieved, causing lowering of the filling rate of the molded body and increase in the iron loss of the dust core. On the other hand, if the time for performing hot forming is too long, thermal decomposition of the rein material used in the binder layer proceeds, whereby the effect of suppressing fluidity of the low-melting-point glass becomes low, causing increase in the iron loss of the dust core. Therefore, it is preferable to set the time for performing hot forming to fall within the range in which heat has been sufficiently conducted to inside of the molded body and deformation of the molded body due to softening of the magnetic powder has been completed and thermal decomposition of the resin material used in the binder layer is suppressed, preferably within the aforementioned range of time for performing hot forming.

As an example thereof, the conditions for the hot forming can be set as follows: the hot forming temperature: 480° C., the hot forming pressure: 8 ton·f/cm$^2$, and hot forming time: 10 seconds.

As shown in the drawing on the right in FIG. 3, the molded body (dust core) 10 obtained after the hot forming has the magnetic powder particles 21 bound together through the binder layer 22 that contains a low-melting-point glass and a resin material. In this embodiment, the volume percentage of the magnetic powder in the dust core 10 is 88% by volume or higher, preferably, 90% by volume or higher.

By using the manufacturing method described above, the dust core according this embodiment can be manufactured.

<How to Determine Direct Current Superimposition Characteristics>

Figure 4:
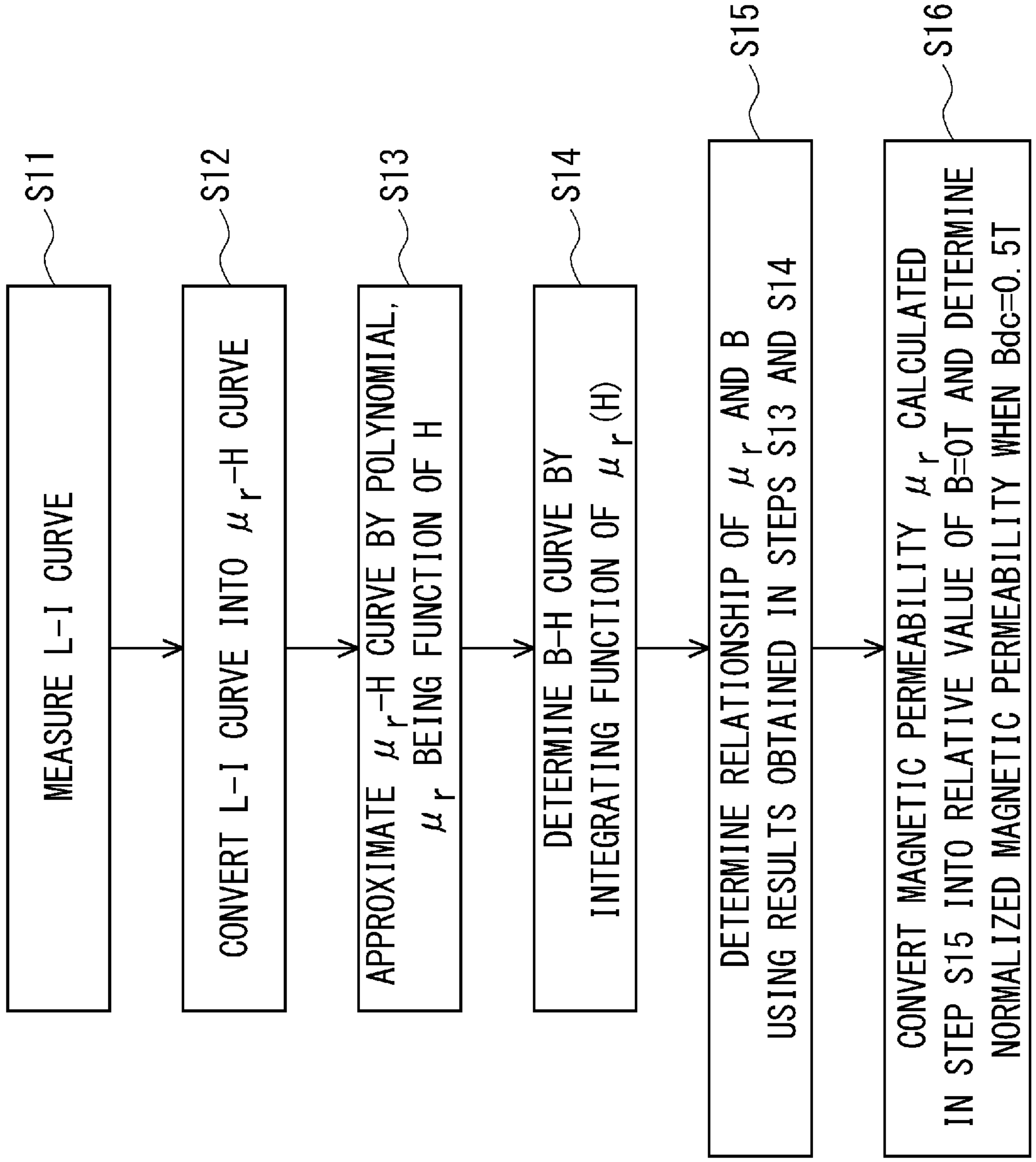
FIG. 4 is a flowchart for describing how to find the direct current superimposition characteristics of a dust core according to an embodiment.

Next, how to determine the direct current superimposition characteristics of a dust core according to this embodiment will be described. FIG. 4 is a flowchart for describing how to determine the direct current superimposition characteristics of a dust core according to this embodiment. FIGS. 5 to 10 are graphs for describing how to determine the direct current superimposition characteristics of a dust core according to this embodiment. Note that the graphs shown in FIGS. 5 to 10 correspond to the graphs that were used when the direct current superimposition characteristics of Example 1 were determined.

Figure 5:
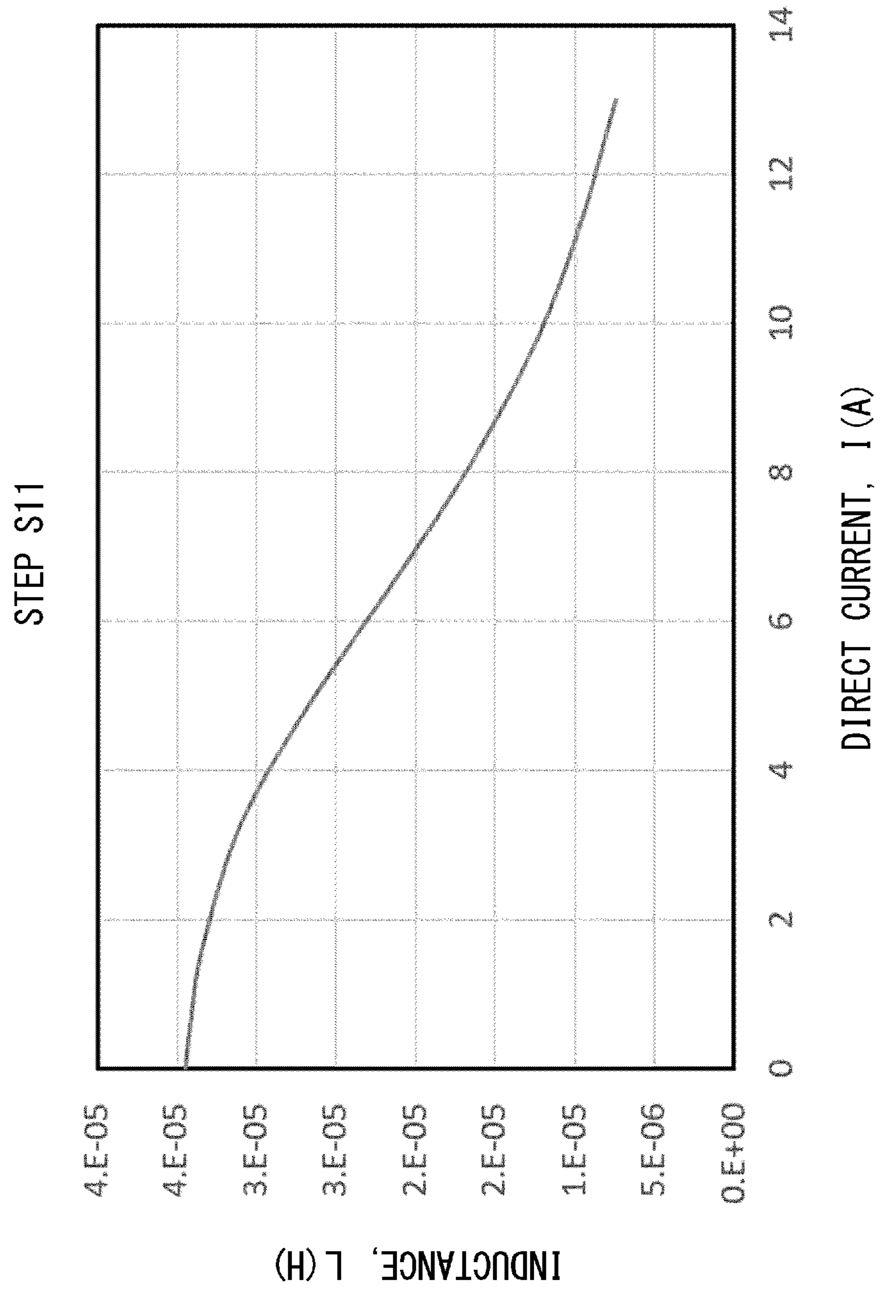
FIG. 5 is a graph for describing how to find the direct current superimposition characteristics of a dust core according to an embodiment (corresponding to Step S11)

As shown in FIG. 4, when determining the direct current superimposition characteristics of a dust core, first, L-I curve is measured using a toroidal core around which a wire is wound (Step S11). In performing measurement of an L-I curve, for example, a direct current superimposition tester can be used. For example, measurement is performed by superimposing a direct current on a sine wave of a frequency of 1 MHz and amplitude of 10 mA. FIG. 5 shows an example of a result of measurement of an L-I curve.

Figure 6:
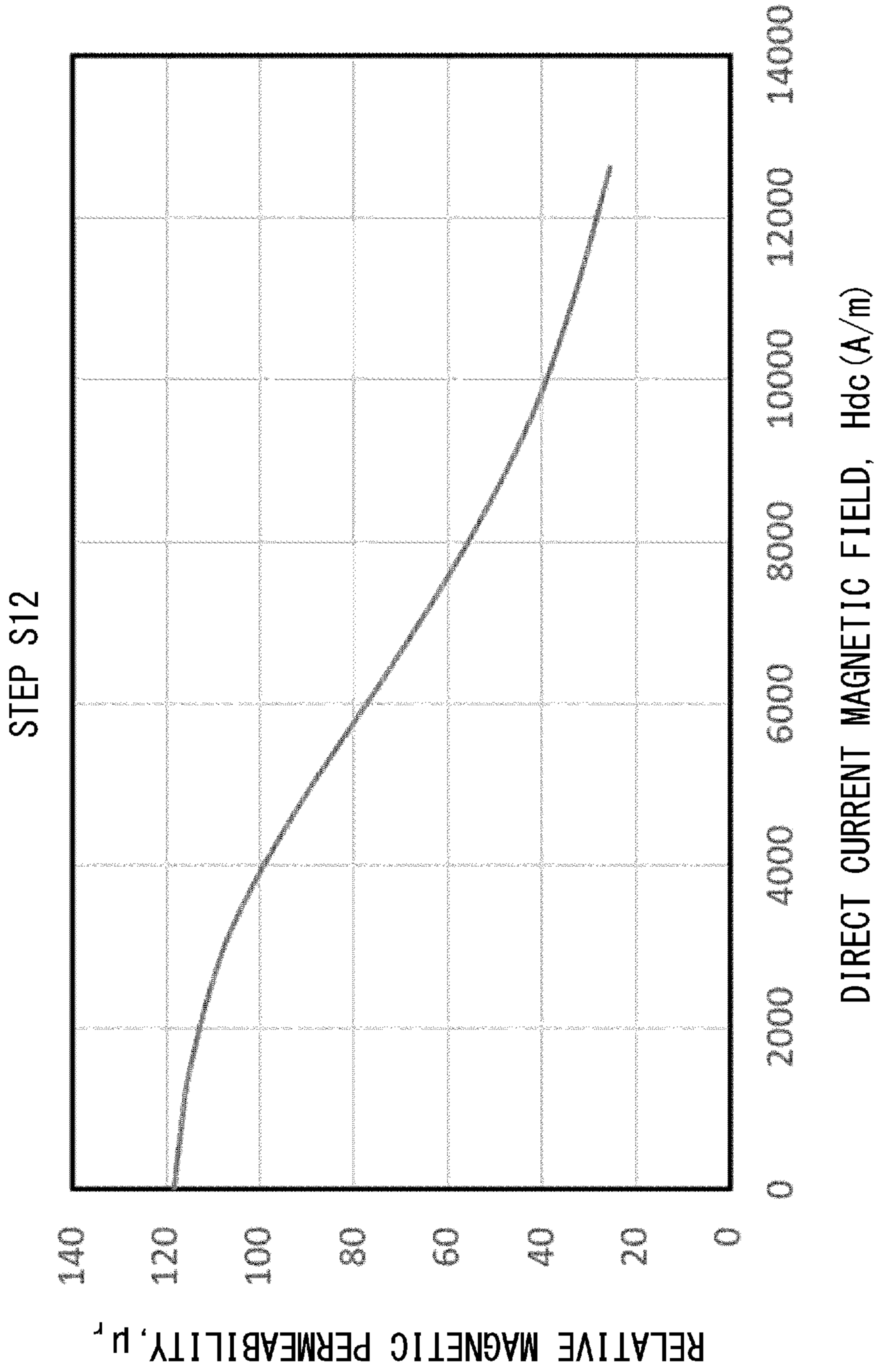
FIG. 6 is a graph for describing how to find the direct current superimposition characteristics of a dust core according to an embodiment (corresponding to Step S12)

Next, the L-I curve measured in Step S11 is converted into a $\mu_r$-H curve (Step S12). In the conversion, the following expression was used. FIG. 6 shows a graph after the L-I curve is converted into a $\mu_r$-H curve. Note that the toroidal core is regarded as an annular solenoid that is substantially a closed magnetic circuit.

$$\mu_r = \frac{L \times l}{\mu_0 \times n^2 \times s} \quad H = \frac{nI}{l} \qquad \text{[Expression 1]}$$

Here, $\mu_r$ represents the relative magnetic permeability, to represents the vacuum magnetic permeability (N/A$^2$), L represents the measured inductance (H), l represents an effective magnetic path length (m), s represents an effective cross-sectional area (m$^2$), and n represents the number of coil windings.

Figure 7:
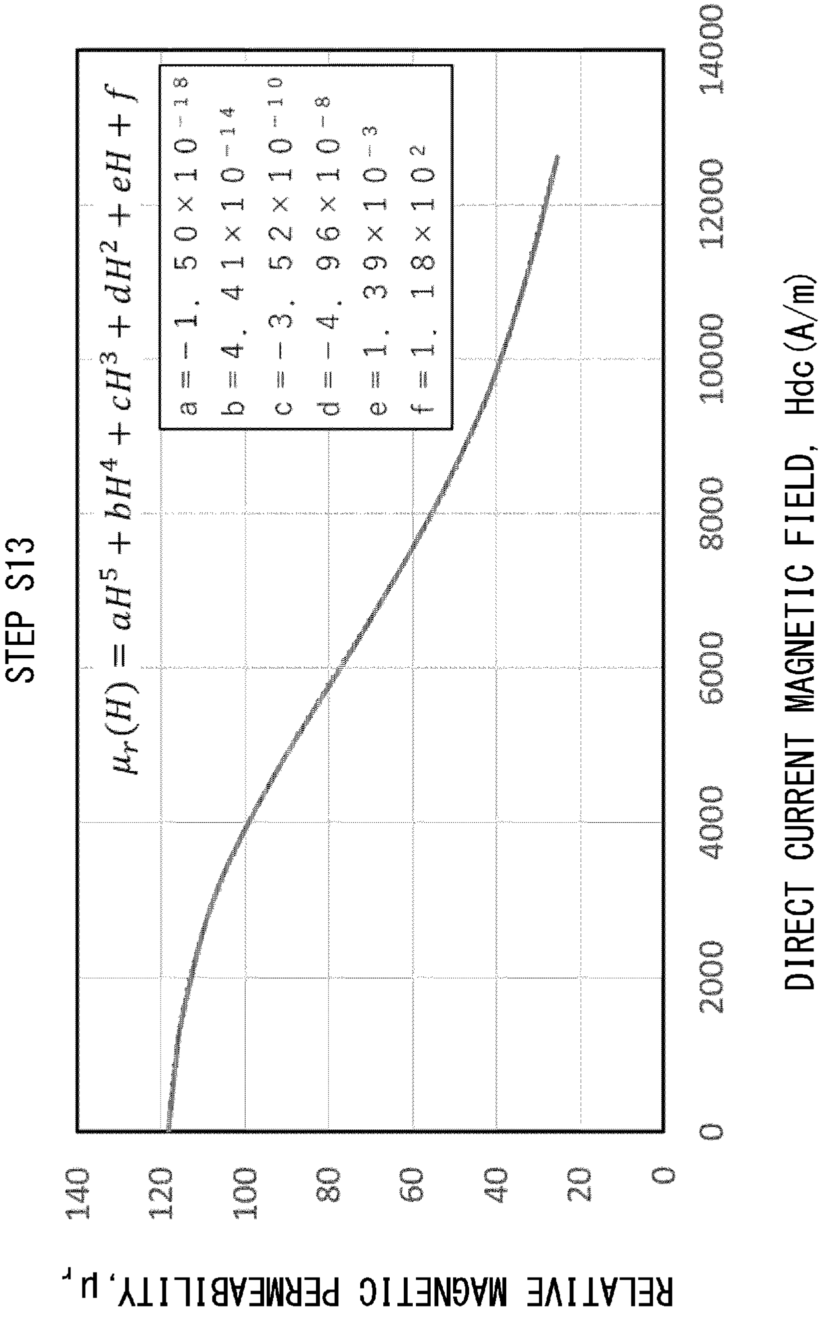
FIG. 7 is a graph for describing how to find the direct current superimposition characteristics of a dust core according to an embodiment (corresponding to Step S13)

Next, the $\mu_r$-H curve determined in Step S12 is approximated using an approximation expression (Step S13). To be more specific, the $\mu_r$-H curve is approximated by the polynomial shown below, where $\mu_r$ is expressed as a function of H. FIG. 7 shows an example in which the $\mu_r$-H curve is approximated by a fifth-order polynomial. Note that the values a to f shown in FIG. 7 correspond to the values calculated in Example 1 described later. Further, in this embodiment, an approximation expression other than a fifth-order polynomial may be used.

$$\mu_r(H) = aH^5 + bH^4 + cH^3 + dH^2 + eH + f \qquad \text{[Expression 2]}$$

Figure 8:
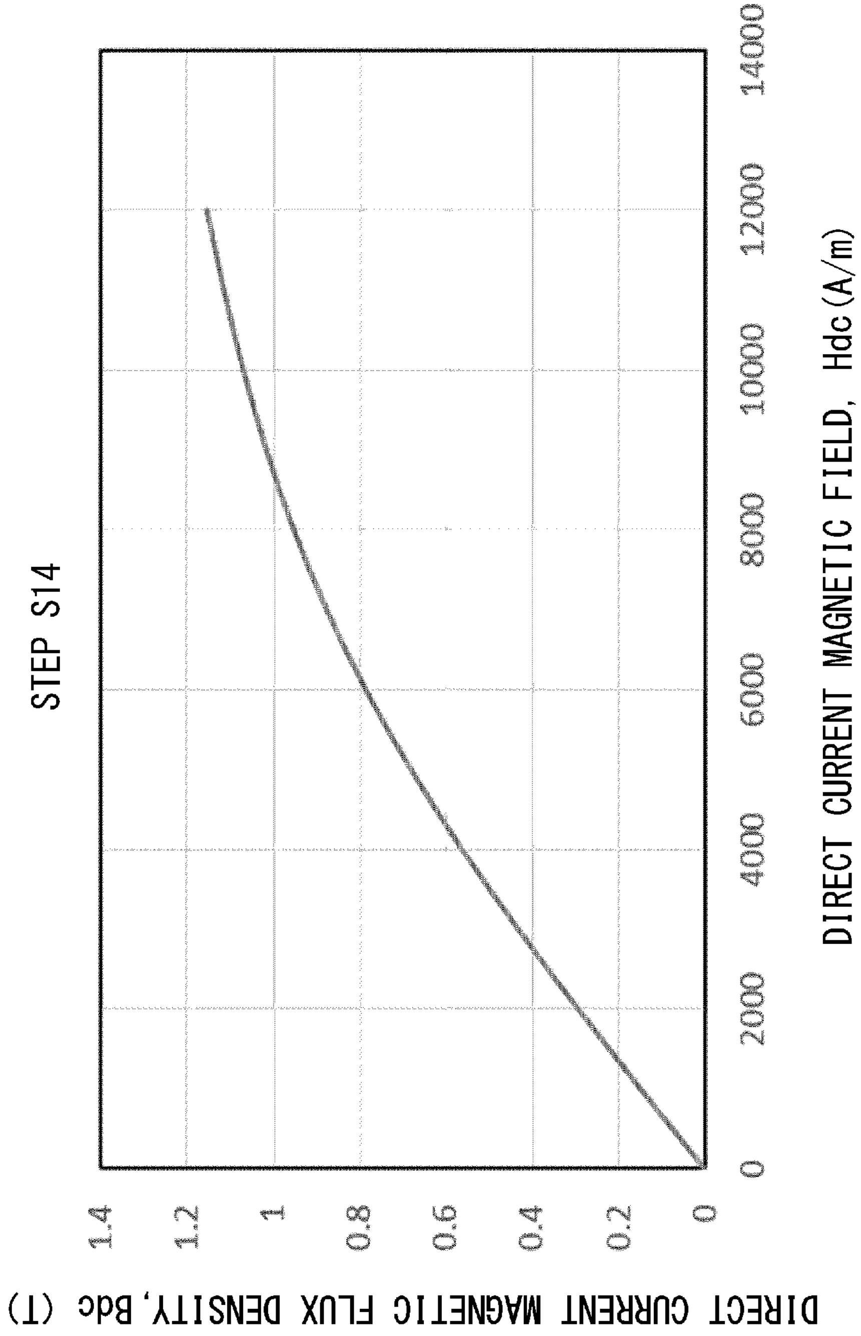
FIG. 8 is a graph for describing how to find the direct current superimposition characteristics of a dust core according to an embodiment (corresponding to Step S14)

Next, as shown in the following expression, an indefinite integral of the function of $\mu_r$ (H) is calculated to determine the relation of B to H (B-H curve) (Step S14). FIG. 8 shows a graph of the determined B-H curve. Note that in this embodiment, since a soft magnetic material in which the residual magnetization is not so large is used, calculation can be performed while assuming that when H=0, B=0 (integration constant C=0).

$$\int \mu_r(H)dH = \frac{a}{6}H^6 + \frac{b}{5}H^5 + \frac{c}{4}H^4 + \frac{d}{3}H^3 + \frac{e}{2}H^2 + fH + C \quad \text{[Expression 3]}$$

$$B = \mu_0 \int \mu_r(H)dH$$

Figure 9:
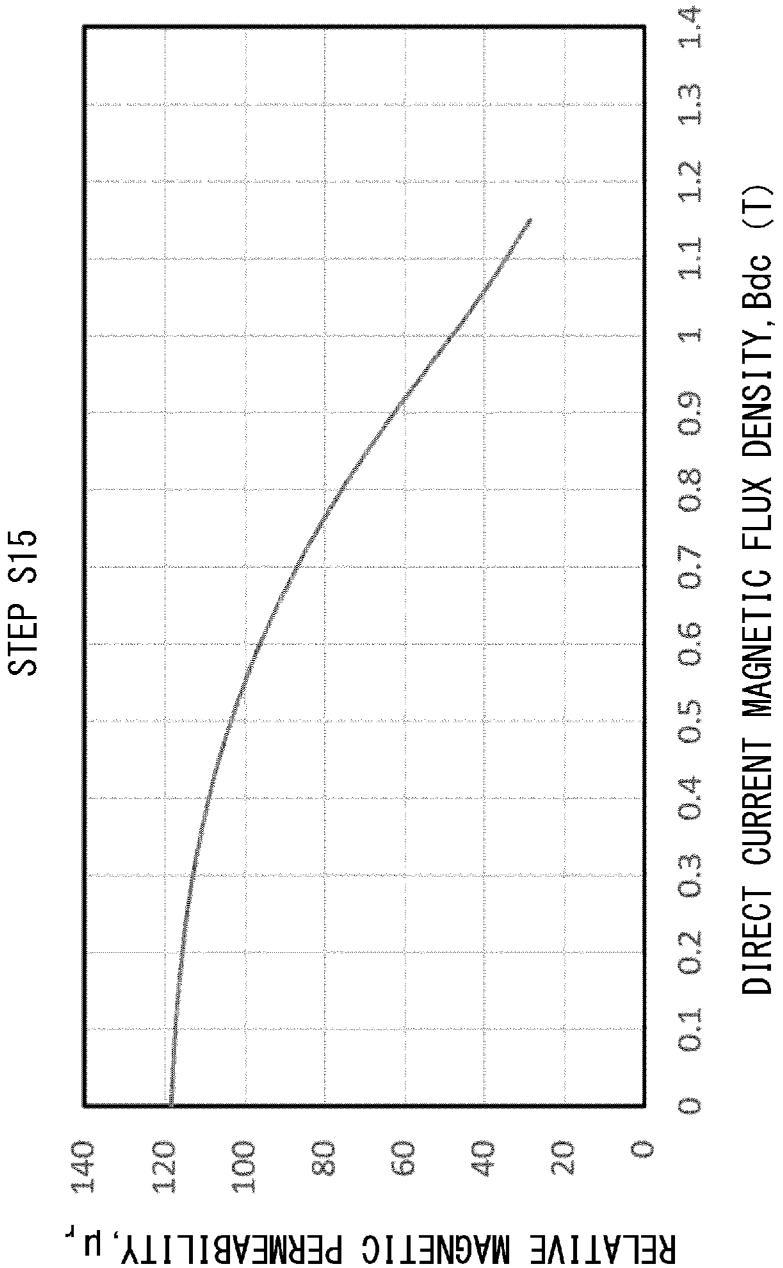
FIG. 9 is a graph for describing how to find the direct current superimposition characteristics of a dust core according to an embodiment (corresponding to Step S15)

Next, using the results obtained in Step S13 and Step S14, the relationship between $\mu_r$ and B is determined (Step S15). FIG. 9 is a graph showing a relationship between $\mu_r$ and B.

Figure 10:
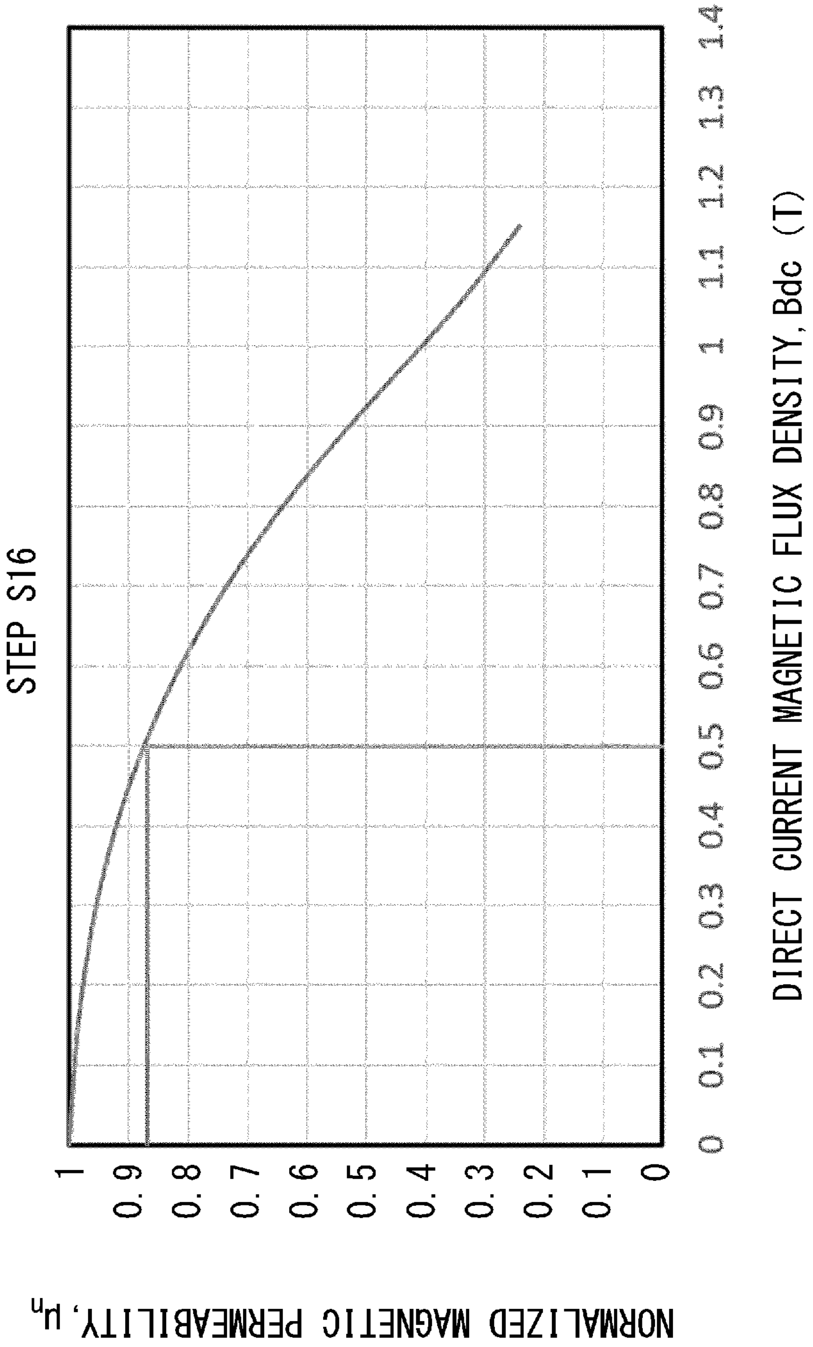
FIG. 10 is a graph for describing how to find the direct current superimposition characteristics of a dust core according to an embodiment (corresponding to Step S16)

Then, the relative magnetic permeability $\mu_r$ calculated in Step S15 is converted into a relative value for B=0 T, and the normalized magnetic permeability when Bdc=0.5 T is determined (Step S16). To be more specific, as shown in FIG. 10, the relative magnetic permeability $\mu_r$ is converted into a relative value on the condition that the relative magnetic permeability $\mu_r$ when B=0 T calculated in Step S15 is defined as 100%. Then, a value of the normalized magnetic permeability when the direct current magnetic flux density Bdc=0.5 T is calculated.

In this embodiment, a value of the normalized magnetic permeability when Bdc=0.5 T calculated as described above is used as the value that indicates the direct current superimposition characteristics. Note that the value of the normalized magnetic permeability when Bdc=0.5 T corresponds to the aforementioned "value expressed by $\mu_{B=0.5\ T}/\mu_{B=0\ T}$, where a magnetic permeability in a state where the magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$".

In the dust core of this embodiment, when a magnetic permeability in a state where the magnetic flux density generated by a direct current is 0 T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher, preferably, 0.8 or higher. Therefore, a dust core with good direct current superimposition characteristics and an inductor using such a dust core can be provided.

EMBODIMENTS

Next, examples will be described.

Example 1

A sample according to Example 1 was prepared using the above-described manufacturing method (see, FIG. 2). The dust core according to Example 1 was formed into a toroidal shape with an outer diameter of 13 mm, an inner diameter of 8 mm, and a height of 3 mm. Specifically, first, magnetic powder was prepared. For the magnetic powder, Fe—Si—B—P—Cu—Cr-based powder which is nanocrystalline powder having a particle size of 11 μm (a median diameter D50) was used. Next, the magnetic powder and low-melting-point glass powder were mixed, and a low-melting-point glass was coated on the magnetic powder by a dry thin film fabrication method. For the low-melting-point glass, a phosphate-based glass was used. At this time, 2.5% by volume of a low-melting-point glass was mixed with the magnetic powder.

Then, the magnetic powder coated with a low-melting-point glass was coated with a resin material and thereby granulated. For the resin material, phenol resin was used, and 2.5% by volume of the resin material was mixed with the magnetic powder.

Next, the granulated magnetic powder was fed into a mold and a pressure was applied thereto under a condition of 500 kgf/cm$^2$, and then the compacted body was heated and cured (hardened) at a temperature of 150° C. without applying any pressure thereto, thereby pre-forming was performed. Then, the pre-formed intermediate molded body was subjected to hot forming while being contained in the mold. The conditions for the hot forming were a molding temperature of 470° C., a pressuring force of 8 tonf/cm$^2$, and a pressuring time of 30 seconds.

Example 2

As a sample according to Example 2, a sample using Fe—B—P—Cu-based powder which is nanocrystalline powder having a particle size of 14 μm (a median diameter D50) as the magnetic powder was prepared. Further, in Example 2, as the condition for the hot forming, the forming temperature was set to 455° C. As regards other conditions, they were the same as those in Example 1.

Example 3

As a sample according to Example 3, a sample using metal glass powder as the magnetic powder was prepared. For the metal glass powder, Fe—B—P—Nb—Cr-based powder having a particle size of 9 μm (a median diameter D50) was used. Further, in Example 3, as the condition for the hot forming, the forming temperature was set to 490° C. As regards other conditions, they were the same as those in the first example.

Example 4

As a sample according to Example 4, a sample using pure iron as the magnetic powder was prepared. For a raw material for the pure iron, carbonyl iron powder having a particle diameter (particle size) of 8 μm (a median diameter D50) was used. As regards other conditions, they were the same as those in Example 1.

Example 5

As a sample according to Example 5, a sample using an Fe—Si-based alloy as the magnetic powder was prepared. For the Fe—Si-based alloy, Fe-3.5Si powder having a particle diameter (particle size) of 10 μm (a median diameter D50) was used. As regards other conditions, they are the same as those in Example 1.

Comparative Example 1

As a sample according to Comparative Example 1, a sample using nanocrystalline powder as the magnetic powder was prepared. For the nanocrystalline powder, Fe—Si—B—P—Cu—Cr-based powder which is nanocrystalline powder having a particle size of 11 μm (a median diameter D50) was used. Further, in Comparative Example 1, by mixing 20% by volume of a resin material in the magnetic powder, the magnetic powder coated with a low-melting-point glass was further coated with the resin material for granulation. Further, as the conditions for forming, cold forming (forming temperature: 25° C.) was adopted. As regards other conditions, they were the same as those in Example 1.

Comparative Example 2

As a sample according to Comparative Example 2, a sample using an Fe—Si-based alloy as the magnetic powder was prepared. For the Fe—Si-based alloy, Fe-5.5Si powder having a particle size of 10 μm (a medina diameter D50) was used. Further, in Comparative Example 2, by mixing 20% by volume of a resin material in the magnetic powder, the magnetic powder coated with a low-melting-point glass was further coated with the resin material for granulation. Further, the conditions for forming was cold forming (forming temperature: 25° C.). As regards other conditions, they were the same as those in Example 1.

<Measurement of Sample>

The filling rate (% by volume) of the magnetic powder, the saturation flux density Bs (T) of the dust core, the initial magnetic permeability, the direct current superimposition characteristics ($\mu_{B=0.5\ T}/\mu_{B=0\ T}$), and the iron loss were measured for each of the samples prepared as described above in Examples 1 to 5 and Comparative Examples 1 and 2.

The filling rate was determined by comparing the volume of the magnetic powder contained in the magnetic core and the volume of the whole magnetic core measured based on Archimedean principle. The volume of the magnetic powder contained in the magnetic core can be calculated by calculating the weight of the magnetic powder contained in the magnetic core by subtracting the weight of low-melting-point glass added as a binder and the weight of the residual resin material from the weight of the whole magnetic core, and then dividing the calculated weight of the magnetic powder by the true density of the magnetic powder.

The magnetic permeability was calculated by using an impedance analyzer at a frequency of 1 MHz, and then iron loss was calculated by a dual-coil method using a B-H analyzer (manufactured by IWATSU ELECTRIC CO., LTD.). The conditions for the measurement were conditions of excitation by a sine wave of 1 MHz and 50 mT. The direct current superimposition characteristics ($\mu_{B=0.5\ T}/\mu_{B=0\ T}$) were determined by the above-described method (see, FIG. 4). Hereinbelow, measurement of direct current superimposition characteristics ($\mu_{B=0.5\ T}/\mu_{B=0\ T}$) of the sample prepared in Example 1 will be described in detail as an example.

<Measurement of Direct Current Superimposition Characteristics>

A wire was wound around the toroidal core according to Example 1 prepared as described above (an outer diameter of 13 mm, an inner diameter of 8 mm, a height of 3 mm). The number of turns the coil (i.e., the wire) was wound was 32. Then, using a direct current superimposition tester (manufactured by Axis-inc.), a direct current was superimposed on a sine wave of a measurement frequency of 1 MHz and an amplitude of 10 mA and an L-I curve of the toroidal core was measured (Step S11 in FIG. 4). FIG. 5 shows a result of measurement of an L-I curve of the sample according to Example 1.

Then, the measured L-I curve was converted into a $\mu_r$-H curve (Step S12 in FIG. 4). In the conversion, the following expression was used.

$$\mu_r = \frac{L \times l}{\mu_0 \times n^2 \times s} \quad H = \frac{nI}{l} \qquad \text{[Expression 4]}$$

Note that $\mu_r$ represents the relative magnetic permeability, $\mu_0$ represents the vacuum magnetic permeability (N/A$^2$), L represents the measured inductance (H), 1 represents an effective magnetic path length (m), s represents an effective cross-sectional area (m$^2$), and n represents the number of coil windings. In this measurement, the parameters are set as shown below. FIG. 6 shows a graph after the L-I curve was converted into a $\mu_r$-H curve.

$\mu_0=1.26\times10^{-6}$ (N/A$^2$)

$1=3.30\times10^{-2}$ (m)

$s=7.47\times10^{-6}$ (m$^2$)

n=32

Next, the converted $\mu_r$-H curve was approximated using an approximation expression (Step S13 in FIG. 4). To be more specific, $\mu_r$ H curve was approximated by the polynomial shown below, where $\mu_r$ is expressed as a function of H.

$$\mu_r(H) = aH^5 + bH^4 + cH^3 + dH^2 + eH + f \qquad \text{[Expression 5]}$$

FIG. 7 shows a result of approximation by a fifth-order polynomial. Note that the value of each constant of the polynomial was as follows.

$a=-1.50\times10^{-18}$ $b=4.41\times10^{-14}$ $c=-3.52\times10^{-10}$ $d=-4.96\times10^{-8}$ $e=1.39\times10^{-3}$ $f=1.18\times10^{2}$ Next, as shown in the following expression, an indefinite integral of the function of $\mu_r$ (H) was calculated to determine the relationship of B to H (B-H curve) (Step S14 in FIG. 4). FIG. 8 shows a graph of the determined B-H curve.

$$\int \mu_r(H)dH = \frac{a}{6}H^6 + \frac{b}{5}H^5 + \frac{c}{4}H^4 + \frac{d}{3}H^3 + \frac{e}{2}H^2 + fH + C \qquad \text{[Expression 6]}$$

$$B = \mu_0 \int \mu_r(H)dH$$

The value of each constant of the aforementioned polynomial was as follows. Note that in this embodiment, since a soft magnetic material in which the residual magnetization was not so large was used, calculation was performed while assuming that when H=0, B=0 (integration constant C=0).

$a/6=-2.49\times10^{-19}$ $b/5=-8.82\times10^{-15}$ $c/4=-8.81\times10^{-11}$ $d/3=-1.65\times10^{-8}$ $e/2=6.95\times10^{-4}$ $f=1.18\times10^{2}$ Next, using the results obtained in Step S13 and Step S14, the relationship of $\mu_r$ and B with respect to H was determined, and further the relationship between $\mu_r$ and B was determined (Step S15 in FIG. 4). FIG. 9 is a graph showing a relationship between $\mu_r$ and B.

Then, the relative magnetic permeability $\mu_r$ calculated in Step S15 was converted into a relative value for B=0 T and the normalized magnetic permeability when Bdc=0.5 T was determined (Step S16 in FIG. 4). To be more specific, as shown in FIG. 10, the relative magnetic permeability $\mu_r$ was converted into a relative value on the condition that the relative magnetic permeability $\mu_r$ when B=0 T calculated in Step S15 is defined as 1. Then, a value of the normalized magnetic permeability when the direct current magnetic flux density Bdc=0.5 T was calculated.

In this embodiment, a value of the normalized magnetic permeability when Bdc=0.5 T calculated as described above (corresponding to the value expressed by $\mu_{B=0.5\ T}/\mu_{B=0\ T}$) was used as the value that indicates the direct current superimposition characteristics. For other Examples and Comparative Examples, the same method as that described above was used to determine the direct current superimposition characteristics.

<Result of Measurement>

The results of measurement performed in Examples 1 to 5 and Comparative Examples 1 and 2 are shown in Table 1. Further, the results of measurement of the direct current superimposition characteristics in Examples 1 to 5 and Comparative Examples 1 and 2, that is, the relationship of the normalized magnetic permeability ($\mu_n$) to the direct current magnetic flux density Bdc (T) is shown in FIG. 11.

TABLE 1

| | Magnetic powder | Forming conditions | Filling rate (vol. %) | Bs(T) of core | Initial magnetic permeability | Direct current superimposition characteristics $\mu_{B=0.5T}/\mu_{B=0T}$ | Iron loss |
|---|---|---|---|---|---|---|---|
| Example 1 | Nanocrystal | Hot forming | 93.7 | 1.32 | 118 | 0.87 | 894 |
| Example 2 | Nanocrystal | Hot forming | 90.7 | 1.55 | 94 | 0.97 | 940 |
| Example 3 | Metal glass | Hot forming | 92.8 | 1.1 | 182 | 0.72 | 978 |
| Example 4 | Pure iron | Hot forming | 94.5 | 1.97 | 91 | 0.71 | 4320 |
| Example 5 | Fe—3.5Si | Hot forming | 88.1 | 1.66 | 63 | 0.65 | 7870 |
| Comparative Example 1 | Nanocrystal | Cold forming | 74.8 | 1.08 | 28 | 0.59 | 3270 |
| Comparative Example 2 | Fe—5.5Si | Cold forming | 74.8 | 1.22 | 24 | 0.63 | 9340 |

Figure 11:
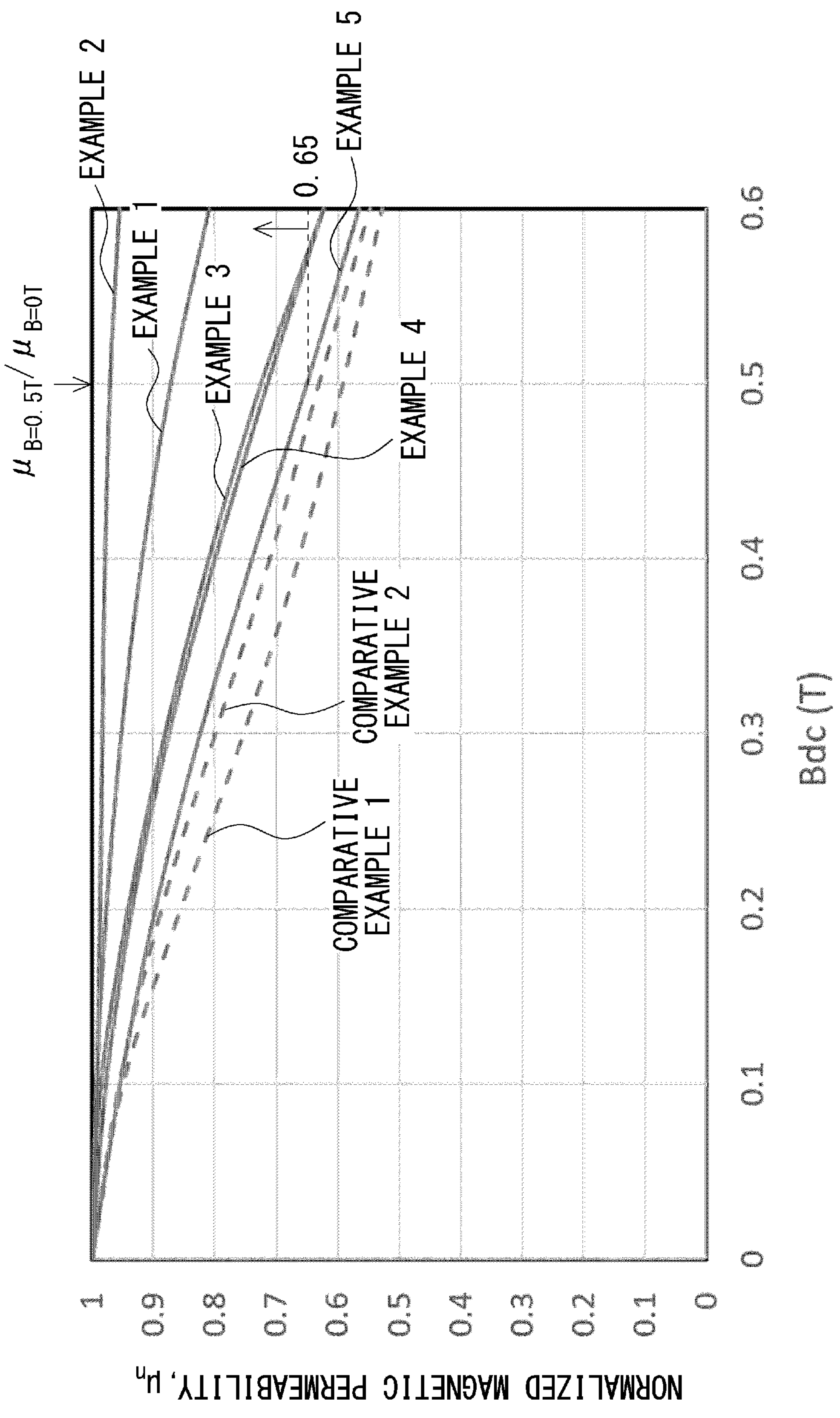
FIG. 11 is a graph showing the direct current superimposition characteristics of a dust core according to an embodiment.

As shown in Table 1 and FIG. 11, the value of the direct current superimposition characteristics ($\mu_{B=0.5\ T}/\mu_{B=0\ T}$) was 0.65 or higher in each of Examples 1 to 5. On the other hand, in Comparative Examples 1 and 2, the value of the direct current superimposition characteristics ($\mu_{B=0.5\ T}/\mu_{B=0\ T}$) was 0.59 and 0.63, respectively. Therefore, in Examples 1 to 5, the values of the direct current superimposition characteristics ($\mu_{B=0.5\ T}/\mu_{B=0\ T}$) were good values. In particular, in Examples 1 and 2, the values of the direct current superimposition characteristics ($\mu_{B=0.5\ T}/\mu_{B=0\ T}$) were 0.87 and 0.97, respectively, which are excellent values.

Further, focusing on the iron loss (the iron loss measured at 1 MHz and 50 mT), in each of Examples 1 to 4, the value of the iron loss was equal to or less than 4500, and good values were exhibited for both the direct current superimposition characteristics and the iron loss. In particular, in Examples 1 to 3, the values of the iron loss were equal to or below 1500, which are good values. Further, focusing on the filling rate, the filling rate when hot forming was adopted was higher than the filling rate when cold forming was adopted.

<Iron Loss Under Various Measurement Conditions>

The iron loss was measured for each of the samples prepared in Examples 1 to 5 and Comparative Example 1 and 2 under various measurement conditions. To be more specific, the iron losses in each Bm under various frequency conditions of 500 kHz, 800 kHz, 1 MHz, and 2 MHz were measured.

The results of measurement of the iron loss measured in each of the frequencies 500 kHz, 800 kHz, 1 MHz, and 2 MHz are shown in Tables 2 to 5.

TABLE 2

Frequency: 500 kHz

| | Magnetic powder | Forming temperature | Iron loss in each Bm ($kW/m^3$) Bm = 10(mT) | Bm = 30(mT) | Bm = 50(mT) | Bm = 100(mT) |
|---|---|---|---|---|---|---|
| Example 1 | Nanocrystal | 470° C. | 6.2 | 90 | 313 | 1689 |
| Example 2 | Nanocrystal | 455° C. | 8.3 | 90 | 271 | 1217 |
| Example 3 | Metal glass | 490° C. | 7.9 | 87 | 267 | 1220 |
| Example 4 | Carbonyl iron | 470° C. | 39 | 515 | 1710 | 8720 |
| Example 5 | Fe—3.5Si | 470° C. | 77 | 884 | 2750 | 12800 |
| Comparative Example 1 | Nanocrystal | 25° C. | 22 | 359 | 1300 | 7470 |
| Comparative Example 2 | Fe—5.5Si | 25° C. | 60 | 1080 | 4120 | 25400 |

TABLE 3

Frequency: 800 kHz

| | Magnetic powder | Forming temperature | Iron loss in each Bm ($kW/m^3$) Bm = 10(mT) | Bm = 30(mT) | Bm = 50(mT) | Bm = 100(mT) |
|---|---|---|---|---|---|---|
| Example 1 | Nanocrystal | 470° C. | 13 | 182 | 629 | 3400 |
| Example 2 | Nanocrystal | 455° C. | 19 | 207 | 625 | 2810 |
| Example 3 | Metal glass | 490° C. | 19 | 207 | 634 | 2890 |
| Example 4 | Carbonyl iron | 470° C. | 72 | 955 | 3170 | 16200 |
| Example 5 | Fe—3.5Si | 470° C. | 156 | 1870 | 5540 | 25800 |
| Comparative Example 1 | Nanocrystal | 25° C. | 41 | 654 | 2370 | 13600 |
| Comparative Example 2 | Fe—5.5Si | 25° C. | 104 | 1860 | 7120 | 44000 |

TABLE 4

| Frequency: 1 MHz | | | | | | |
|---|---|---|---|---|---|---|
| | Magnetic | Forming | Iron loss in each Bm (kW/m$^3$) | | | |
| | powder | temperature | Bm = 10(mT) | Bm = 30(mT) | Bm = 50(mT) | Bm = 100(mT) |
| Example 1 | Nanocrystal | 470° C. | 18 | 258 | 894 | 4830 |
| Example 2 | Nanocrystal | 455° C. | 29 | 311 | 940 | 4220 |
| Example 3 | Metal glass | 490° C. | 29 | 320 | 978 | 4460 |
| Example 4 | Carbonyl iron | 470° C. | 99 | 1302 | 4320 | 22000 |
| Example 5 | Fe—3.5Si | 470° C. | 221 | 2534 | 7870 | 36700 |
| Comparative Example 1 | Nanocrystal | 25° C. | 57 | 903 | 3270 | 18800 |
| Comparative Example 2 | Fe—5.5Si | 25° C. | 136 | 2443 | 9340 | 57700 |

TABLE 5

| Frequency: 2 MHz | | | | | | |
|---|---|---|---|---|---|---|
| | Magnetic | Forming | Iron loss in each Bm (kW/m$^3$) | | | |
| | powder | temperature | Bm = 10(mT) | Bm = 30(mT) | Bm = 50(mT) | Bm = 100(mT) |
| Example 1 | Nanocrystal | 470° C. | 57 | 826 | 2860 | 15500 |
| Example 2 | Nanocrystal | 455° C. | 106 | 1150 | 3470 | 15600 |
| Example 3 | Metal glass | 490° C. | 129 | 1430 | 4370 | 19900 |
| Example 4 | Carbonyl iron | 470° C. | 279 | 3690 | 12300 | 62400 |
| Example 5 | Fe—3.5Si | 470° C. | 710 | 8130 | 25300 | 118000 |
| Comparative Example 1 | Nanocrystal | 25° C. | 214 | 3410 | 12400 | 71000 |
| Comparative Example 2 | Fe—5.5Si | 25° C. | 338 | 6050 | 23100 | 143000 |

As shown in Tables 2 to 5, the values of the iron loss in each Bm became larger as the frequency became higher. Further, the values of the iron loss became higher as the values of the Bm became higher.

As described above, the present disclosure has been described based on the above-described embodiments but the present disclosure is not to be limited to those embodiments and can be varied, modified, or combined as appropriate by a person skilled in the art without departing from the scope of the claims of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A dust core comprising magnetic powder particles that are bound together through a binder layer, wherein an initial magnetic permeability is 63 or higher, and when a magnetic permeability in a state where a magnetic flux density generated by a direct current is 0T is represented by $\mu_{B=0\ T}$ and a magnetic permeability in a state where the magnetic flux density generated by a direct current is 0.5 T is represented by $\mu_{B=0.5\ T}$, a value expressed by $\mu_{B=0.5\ T}/\mu_{B=0\ T}$ is 0.65 or higher.

2. The dust core according to claim 1, wherein the value expressed by $\mu_{B=0.5\ T}/\mu_{B=0\ T}$ is 0.8 or higher.

3. The dust core according to claim 1, wherein the dust core contains 90% by volume or higher of the magnetic powder.

4. The dust core according to claim 1, wherein an iron loss in the dust core at 1 MHz and 50 mT is 4500 kW/m$^3$ or lower.

5. The dust core according to claim 1, wherein an iron loss in the dust core at 1 MHz and 50 mT is 1500 kW/m$^3$ or lower.

6. The dust core according to claim 1, wherein the magnetic powder is metal glass powder or nanocrystalline powder.

7. The dust core according to claim 1, wherein the binder layer contains a low-melting-point glass and a resin material.

8. The dust core according to claim 7, wherein the low-melting-point glass is a phosphate-based glass or a tin phosphate-based glass.

9. The dust core according to claim 7, wherein the resin material is at least one type of resin selected from the group consisting of phenolic resin, polyimide resin, epoxy resin, and acrylic resin.

10. An inductor comprising the dust core according to claim 1 and a coil.

11. The dust core according to claim 1, wherein the dust core contains 88% by volume or higher of the magnetic powder.

* * * * *